United States Patent
Kakinuma et al.

(10) Patent No.: US 9,355,466 B2
(45) Date of Patent: May 31, 2016

(54) IMAGE PROCESSING APPARATUS, IMAGE PROCESSING SYSTEM, IMAGE PROCESSING METHOD, AND STORAGE MEDIUM

(71) Applicants: Akihiro Kakinuma, Tokyo (JP); Hiroshi Takahashi, Tokyo (JP); Naohiro Kamijo, Tokyo (JP); Chiba University, Chiba (JP)

(72) Inventors: Akihiro Kakinuma, Kanagawa (JP); Hiroshi Takahashi, Kanagawa (JP); Naohiro Kamijo, Kanagawa (JP); Norimichi Tsumura, Chiba (JP); Satomi Tanaka, Chiba (JP)

(73) Assignees: Ricoh Company, Ltd., Tokyo (JP); Chiba University, Chiba (JP)

( * ) Notice: Subject to any disclaimer, the term of this patent is extended or adjusted under 35 U.S.C. 154(b) by 0 days.

(21) Appl. No.: 14/576,352

(22) Filed: Dec. 19, 2014

(65) Prior Publication Data
US 2015/0178950 A1    Jun. 25, 2015

(30) Foreign Application Priority Data

Dec. 24, 2013  (JP) ................ 2013-265707
Oct. 1, 2014   (JP) ................ 2014-202831

(51) Int. Cl.
*G06K 9/00*  (2006.01)
*G06T 7/40*  (2006.01)
*H04N 9/64*  (2006.01)
(Continued)

(52) U.S. Cl.
CPC .............. *G06T 7/408* (2013.01); *H04N 1/6075* (2013.01); *H04N 1/6077* (2013.01); *H04N 1/6086* (2013.01); *H04N 1/628* (2013.01);
(Continued)

(58) Field of Classification Search
CPC ............... G06T 7/408; G06T 2207/10024; G06T 2207/30201; H04N 9/643; H04N 1/6075; H04N 1/6077; H04N 1/6086; H04N 1/628
USPC .................................... 382/165, 167
See application file for complete search history.

(56) References Cited

U.S. PATENT DOCUMENTS 7,139,511 B2    11/2006  Ishibashi
7,352,880 B2 *   4/2008  Kim .................. G06K 9/00228
                                              382/103

(Continued)

FOREIGN PATENT DOCUMENTS

EP    1771013       4/2007
JP    2003-275179   9/2003

(Continued)

OTHER PUBLICATIONS

Extended European Search Report dated May 13, 2015.
(Continued)

*Primary Examiner* — Kanjibhai Patel
(74) *Attorney, Agent, or Firm* — IPUSA, PLLC

(57) ABSTRACT

An image processing apparatus includes a skin information obtaining unit that extracts a skin area from an image and obtains skin information from the skin area; an independent component extracting unit that extracts independent components constituting the skin area from the skin information; and a bias calculation unit that calculates, based on the independent components, a bias representing color information of a light source used to illuminate the skin area when the image is captured.

13 Claims, 15 Drawing Sheets

(51) Int. Cl.
*H04N 1/60* (2006.01)
*H04N 1/62* (2006.01)

(52) U.S. Cl.
CPC ..... *H04N 9/643* (2013.01); *G06T 2207/10024* (2013.01); *G06T 2207/30201* (2013.01)

(56) References Cited

U.S. PATENT DOCUMENTS

| | | | |
|---|---|---|---|
| 7,366,350 B2 | 4/2008 | Kajihara | |
| 8,103,094 B2 * | 1/2012 | Wilensky | H04N 1/6077 348/223.1 |
| 8,498,460 B2 * | 7/2013 | Patwardhan | A61B 5/0077 382/128 |
| 2007/0065006 A1 | 3/2007 | Wilensky | |
| 2012/0014598 A1 | 1/2012 | Nakagawa et al. | |
| 2013/0135336 A1 | 5/2013 | Kakinuma | |
| 2013/0336586 A1 | 12/2013 | Moriuchi et al. | |

FOREIGN PATENT DOCUMENTS

| | | |
|---|---|---|
| JP | 2004-192614 | 7/2004 |
| JP | 2004-354624 | 12/2004 |
| JP | 2006-041804 | 2/2006 |
| JP | 2012-023692 | 2/2012 |
| JP | 2013-250536 | 12/2013 |
| WO | 2011/105731 | 9/2011 |
| WO | 2014/136530 | 9/2014 |

OTHER PUBLICATIONS

Tsumura N et al.: "Image-based skin color and texture analysis/synthesis by extracting hemoglobin and melanin information in the skin", ACM Transactions on Graphics (TOG), ACM, US, vol. 22, No. 3, Jul. 1, 2003, pp. 770-779, XP009103890.

* cited by examiner 301   302

303   304

301

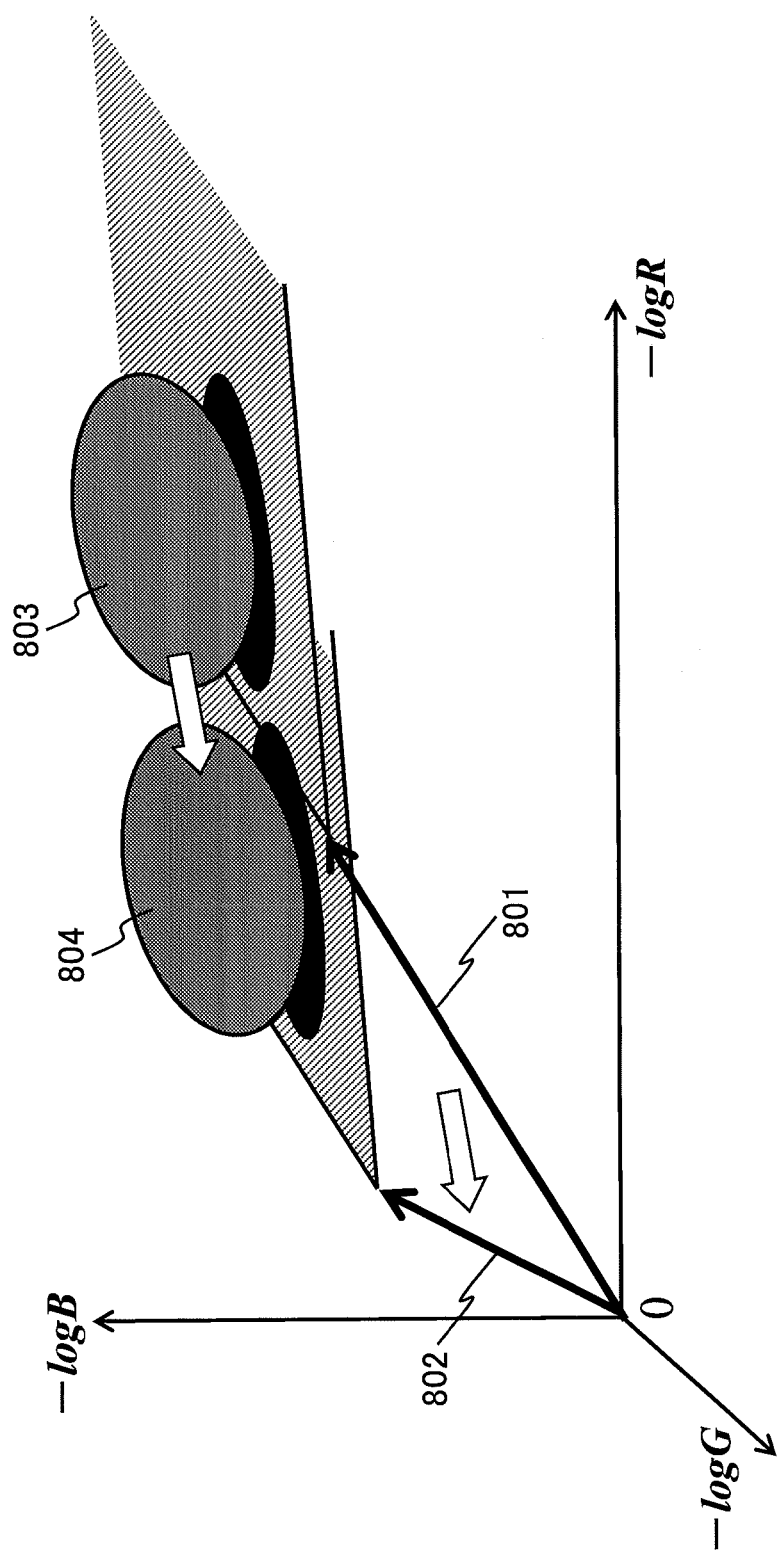

IMAGE PROCESSING APPARATUS, IMAGE PROCESSING SYSTEM, IMAGE PROCESSING METHOD, AND STORAGE MEDIUM

CROSS-REFERENCE TO RELATED APPLICATIONS

The present application is based upon and claims the benefit of priority of Japanese Patent Application No. 2013-265707 filed on Dec. 24, 2013 and Japanese Patent Application No. 2014-202831 filed on Oct. 1, 2014, the entire contents of which are incorporated herein by reference.

BACKGROUND OF THE INVENTION

1. Field of the Invention

An aspect of this disclosure relates to an image processing apparatus, an image processing system, an image processing method, and a storage medium.

2. Description of the Related Art

Digital image data (which is hereafter simply referred to as "image data") is obtained by, for example, capturing an image with a digital camera or scanning a document such as a photograph with a scanner. Such image data is used in various manners. For example, image data is output by a printer onto recording paper, or is displayed on multiple monitors connected via the Internet.

Thus, image data is output to, for example, recording paper or monitors and is thereby made visible. Depending on purposes, image data needs to be output with high image quality.

Image quality may be degraded by various causes. Particularly, a phenomenon where a color (hue) of an object in image data appears to be different from a memory color of the object causes a viewer to feel odd, and is one of the causes that greatly degrade image quality. The phenomenon where the color (hue) of an object changes is called, for example, "color casting". To reduce or prevent color casting, it is necessary to perform a complicated correction process on image data with, for example, image conversion software.

Although color casting is caused by various reasons, it is normally caused by the influence of a light source used when capturing image data.

When the color temperature of a light source used when capturing image data of an object is higher or lower than the color temperature of a standard white light source (e.g., a light source with a color temperature of 5000 K), the color (hue) of the object naturally changes depending on the color temperature of the used light source. Because human vision has a characteristic to adapt to light sources with different color temperatures to some extent, a change in the color (hue) of an object appears to be less significant in an environment where image data of the object is captured. For this reason, when a viewer sees a change in the color (hue) of an object in captured image data, it causes the viewer to feel odd.

Also, the spectral sensitivity of human eyes does not generally match the spectral sensitivity of an image sensor. Therefore, depending on the spectral characteristics of a light source used when capturing image data of an object, the color (hue) of the object may be seen as normal for human eyes (regardless of the adaptation of human vision), but may be changed in the captured image data.

To prevent or reduce the above problems, it is necessary to obtain or estimate characteristic information (e.g., a color temperature and/or spectral characteristics) of a light source used when capturing image data, and correct the image data based on the characteristic information.

To obtain accurate characteristic information of a light source used when capturing image data, sensors for obtaining the characteristic information may be provided separately from an image sensor. However, this approach may increase the costs and/or the size of an imaging apparatus, and is therefore not the best solution. For this reason, characteristic information of a light source used when capturing image data is generally estimated by analyzing information of the captured image data.

Here, different from primary colors such as red and yellow, a slight change in a skin color greatly influences the visual appearance of an image, and therefore a change in a skin color caused by color casting tends to greatly reduce image quality. For this reason, it is necessary to more accurately estimate light source characteristics when capturing image data of a person, and methods for estimating light source characteristics based on skin information in image data have been proposed.

For example, Japanese Laid-Open Patent Publication No. 2012-023692 discloses an image processing method for preventing a problem such as color casting in an image. In the disclosed image processing method, a skin portion and a high-intensity portion are extracted from image data, and image correction is performed such that the positional relationship between the skin portion and the high-intensity portion in a color space becomes equal to the positional relationship of a reference vector.

With the image processing method disclosed by Japanese Laid-Open Patent Publication No. 2012-023692, however, because the skin portion and the high-intensity portion are extracted without taking into account the correlation between them, it is not possible to accurately perform color correction when the light source conditions for the skin portion and the high-intensity portion are different from each other.

Also with the disclosed method, it is not possible to accurately perform color correction when a high-lightness portion of an object with high saturation (e.g., a bright portion of a yellow object) is extracted as the high-intensity portion.

SUMMARY OF THE INVENTION

In an aspect of this disclosure, there is provided an image processing apparatus including a skin information obtaining unit that extracts a skin area from an image and obtains skin information from the skin area; an independent component extracting unit that extracts independent components constituting the skin area from the skin information; and a bias calculation unit that calculates, based on the independent components, a bias representing color information of a light source used to illuminate the skin area when the image is captured.

BRIEF DESCRIPTION OF THE DRAWINGS

FIG. 8 is a drawing exemplifying a process of replacing a bias with a reference bias;

DESCRIPTION OF THE PREFERRED EMBODIMENTS

Embodiments of the present invention are described below with reference to the accompanying drawings.

<<First Embodiment>>
<Hardware Configuration of Image Processing Apparatus>

Figure 1:
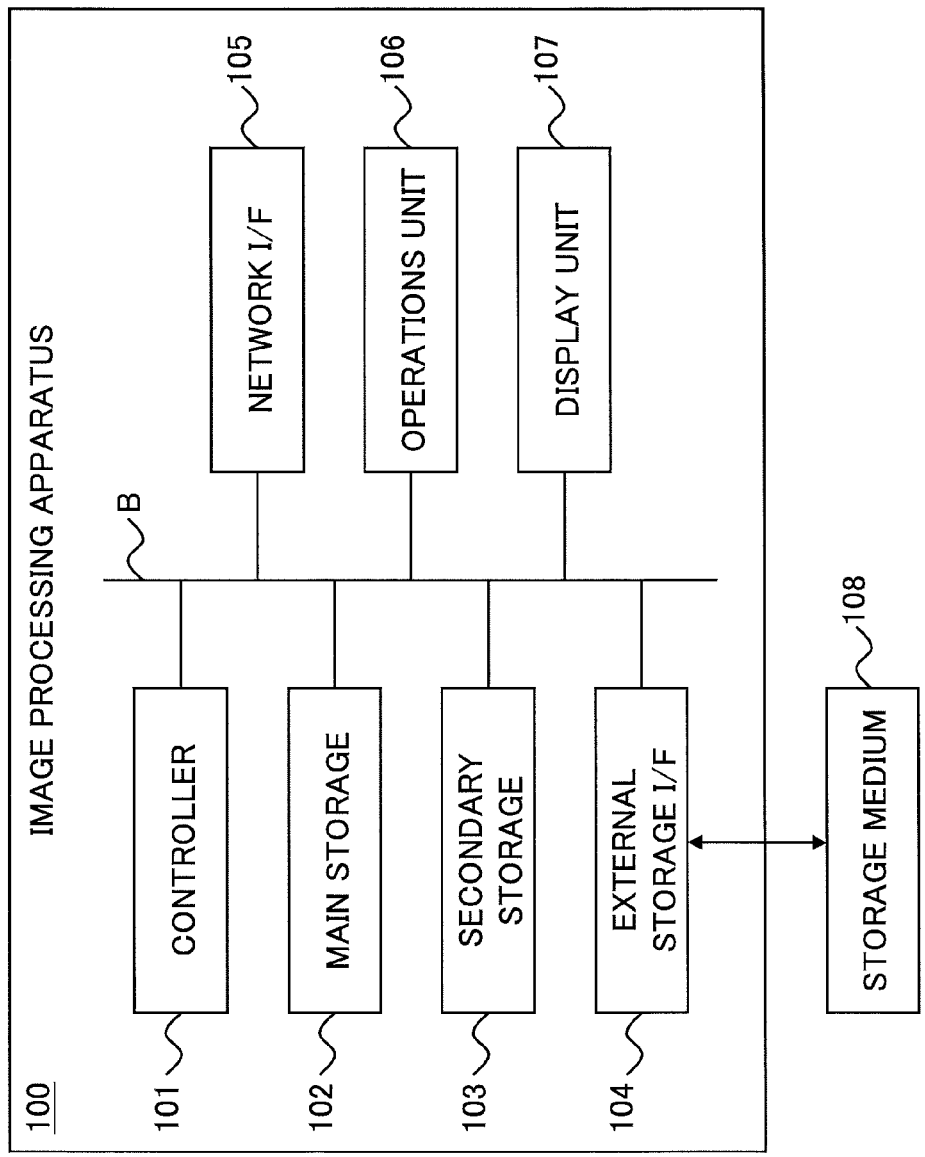
FIG. 1 is a block diagram exemplifying a hardware configuration of an image processing apparatus according to a first embodiment.

FIG. 1 is a block diagram exemplifying a hardware configuration of an image processing apparatus 100 according to a first embodiment.

As illustrated by FIG. 1, the image processing apparatus 100 may include a controller (processor) 101, a main storage 102, a secondary storage 103, an external storage I/F 104, a network I/F 105, an operations unit 106, and a display unit 107 that are connected to each other via a bus B.

The controller 101 is a central processing unit (CPU) that controls other components of the image processing apparatus 100 and performs calculations and data processing. More specifically, the controller 101 is a processor that executes programs stored in the main storage 12 to receive data from an input unit or a storage unit, process the received data, and output the processed data to an output unit or a storage unit.

The main storage 102 is implemented by, for example, a read-only memory (ROM) or a random access memory (RAM), and (temporarily) stores data and programs such as basic software (operating system (OS)) and application programs to be executed by the controller 101.

The secondary storage 103 is implemented by, for example, a hard disk drive (HDD) and stores data related to programs to be executed.

The external storage I/F 104 is an interface between the image processing apparatus 100 and a storage medium 108 (e.g., a flash memory) that is connected via a data transmission line such as a universal serial bus (USB).

The storage medium 108 stores, for example, programs. The stored programs are installed via the external storage I/F 104 into the image processing apparatus 100 and become executable by the image processing apparatus 100.

The network I/F 105 is an interface between the image processing apparatus 100 and other devices that include communication units and are connected to the image processing apparatus 100 via a network, such as a local area network (LAN) or a wide area network (WAN), implemented by wired and/or wireless data transmission channels.

The operations unit 106 is implemented by, for example, key switches composed of hardware keys and a mouse.

The display unit 107 is implemented by, for example, a liquid crystal display or an organic electroluminescence (EL) display. The display unit 107 displays, for example, images and operation icons, and functions as a user interface for a user to perform various settings to use functions of the image processing apparatus 100.

<Functional Configuration of Image Processing Apparatus>

Figure 2:
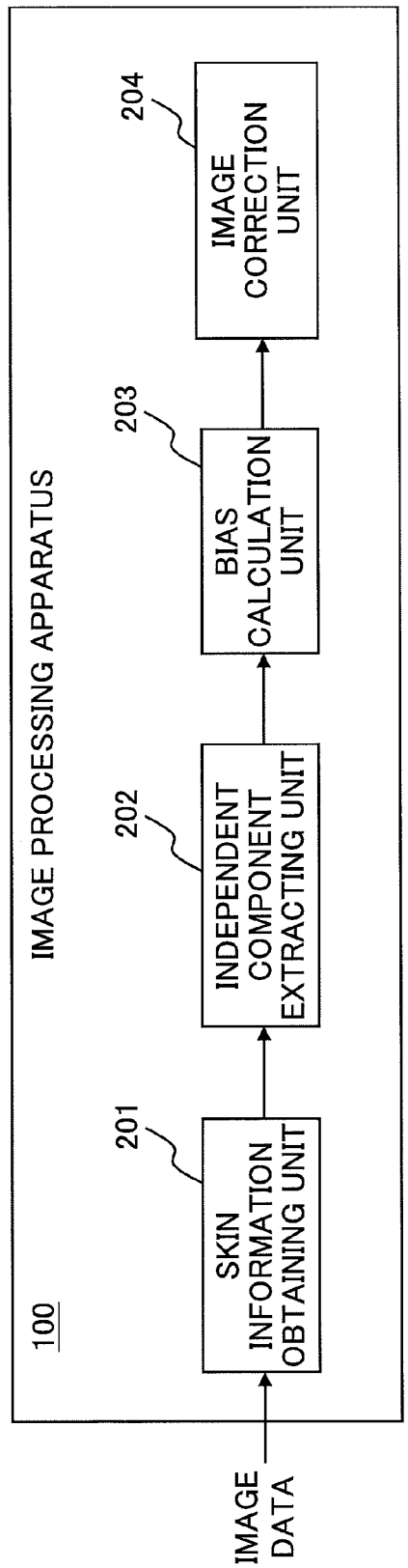
FIG. 2 is a block diagram exemplifying a functional configuration of an image processing apparatus according to the first embodiment.

FIG. 2 is a block diagram exemplifying a functional configuration of the image processing apparatus 100 according to the first embodiment.

As illustrated by FIG. 2, the image processing apparatus 100 of the first embodiment may include a skin information obtaining unit (module) 201, an independent component extracting unit (module) 202, a bias calculation unit (module) 203, and an image correction unit (module) 204.

The skin information obtaining unit 201, the independent component extracting unit 202, the bias calculation unit 203, and the image correction unit 204 are implemented by executing programs stored in, for example, the main storage 102 by the controller 101 (FIG. 1).

Below, operations of the respective units 201 through 204 are described with reference to FIGS. 3A through 10B using an exemplary process where light source characteristics of image data input to the image processing apparatus 100 are estimated and image correction is performed based on the estimated light source characteristics.

<Extracting Skin Areas and Obtaining Skin Information>

When image data (which is hereafter referred to as "input image data") including an image of a person (which is hereafter referred to as a "person image") is input to the image processing apparatus 100, the skin information obtaining unit 201 extracts skin areas from the input image data and obtains skin information of the person image.

Figure 3A:
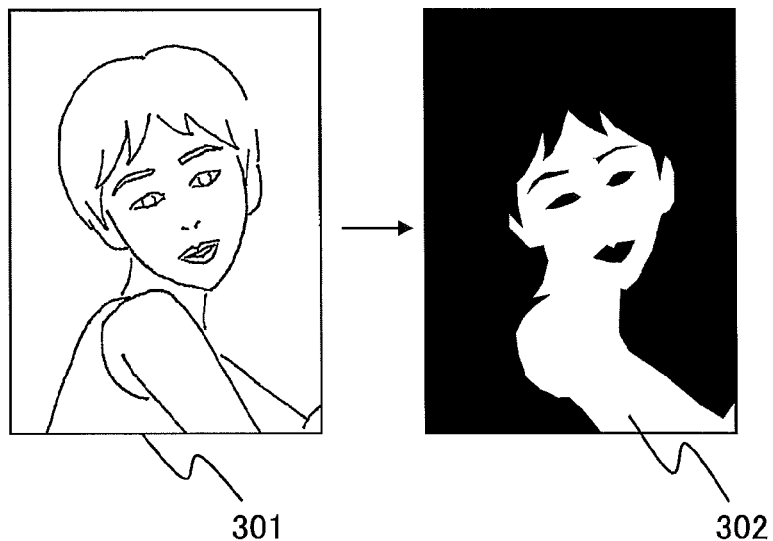
FIGS. 3A and 3B are drawings exemplifying input image data and skin areas.
Figure 3B:
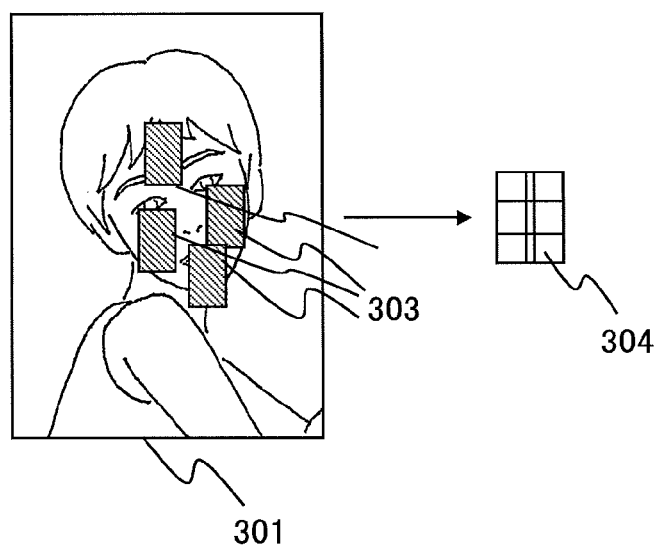

FIGS. 3A and 3B illustrate examples of input image data 301 input to the image processing apparatus 100 and skin areas 302 and 304 extracted by the skin information obtaining unit 201. FIG. 3A illustrates a case where almost the entirety of the skin area 302 (white portion) present in the input image data 301 is extracted.

In the case of FIG. 3A, the skin information obtaining unit 201 compares color information of each pixel of the input image data 301 with a predetermined skin color criterion to determine whether the pixel represents skin (or whether the pixel is a skin area or a non-skin area). The skin information obtaining unit 201 compares color information of all pixels constituting the input image data 301 with the skin color criterion, and automatically determines a group of pixels representing skin as the skin area 302.

FIG. 3B illustrates a case where multiple skin portions 303 in the person image in the input image data 301 are extracted as the skin area (skin patch) 304.

In the case of FIG. 3B, the skin information obtaining unit 201 performs face detection and extracts a face portion of the person image from the input image data 301. After extracting the face portion, the skin information obtaining unit 201 detects the positions of, for example, eyes, a mouth, and eyebrows in the face portion, and determines the positions of the skin portions 303 to be extracted based on the positional relationship of the skin portions 303 with the eyes, the mouth, and the eyebrows. In the example of FIG. 3B, the skin portions 303 are extracted from four positions, i.e., a forehead, cheeks, and a chin. However, the skin portions 303 may be extracted from any positions in a skin area. The skin patch 304 of FIG. 3B has a rectangular shape composed of four rectangular skin portions 303. However, a skin patch and skin portions may have shapes other than rectangular shapes.

Exemplary cases where the skin areas 302 and 304 are automatically extracted by the skin information obtaining unit 201 are described above with reference to FIGS. 3A and 3B. However, skin areas may also be manually specified by a user using the operations unit 106 on the display unit 107 displaying the input image data 301.

After the skin area 302/304 is extracted from the input image data 301, the skin information obtaining unit 201 obtains skin information of pixels constituting the skin area 302/304.

The skin information is represented by 8-bit gradation values (0 through 255) of RGB components of all pixels constituting the skin area 302/304. When the input image data 301 is represented by halftone dots in the CMYK color model used, for example, for offset printing, the input image data 301 is converted into the RGB color model using a conversion table before skin information is obtained.

<Extracting Independent Components of Skin Area>

After the skin information is obtained from the skin area 302/304 by the skin information obtaining unit 201, the independent component extracting unit 202 extracts independent components (described later) constituting the skin area 302/304 from the skin information.

Skin has a layered structure including, from the epidermis side, an epidermal layer including melanin as a principal pigment, a dermal layer including hemoglobin as a principal pigment, and a subcutaneous tissue. It is known that the appearance of a skin color (color reproduction caused by internal reflection) mainly depends on pigment components of melanin and hemoglobin.

The pigment characteristics of melanin and hemoglobin of the human being do not vary between individuals, and the pigment components of melanin and hemoglobin can be treated independently (however, the pigment concentrations of melanin and hemoglobin may vary depending on portions of skin and from person to person, and therefore the appearance of skin may vary). In a logarithmic space where -log R, -log G, and -log B for the RGB components of an image signal are assigned, respectively, to the x-axis, the y-axis, and the z-axis, a pigment component of melanin and a pigment component of hemoglobin can be expressed as independent components that have different directions and intersect at one point.

Depending on the position of a light source for illuminating human skin, a dark portion and a bright portion are generated in the human skin. Such shading of human skin can be expressed as a shading component independently of the two pigment components described above. The shading component has a (1, 1, 1) direction in the logarithmic space.

Thus, a skin color can be separated into independent components including a pigment component of melanin, a pigment component of hemoglobin, and a shading component determining the shading of skin. The skin color varies depending on portions of skin even in the same person image. This is because the density of each of independent components (a melanin pigment component, a hemoglobin pigment component, and a shading component) extracted by the independent component extracting unit 202 varies depending on portions of skin.

Figure 4:
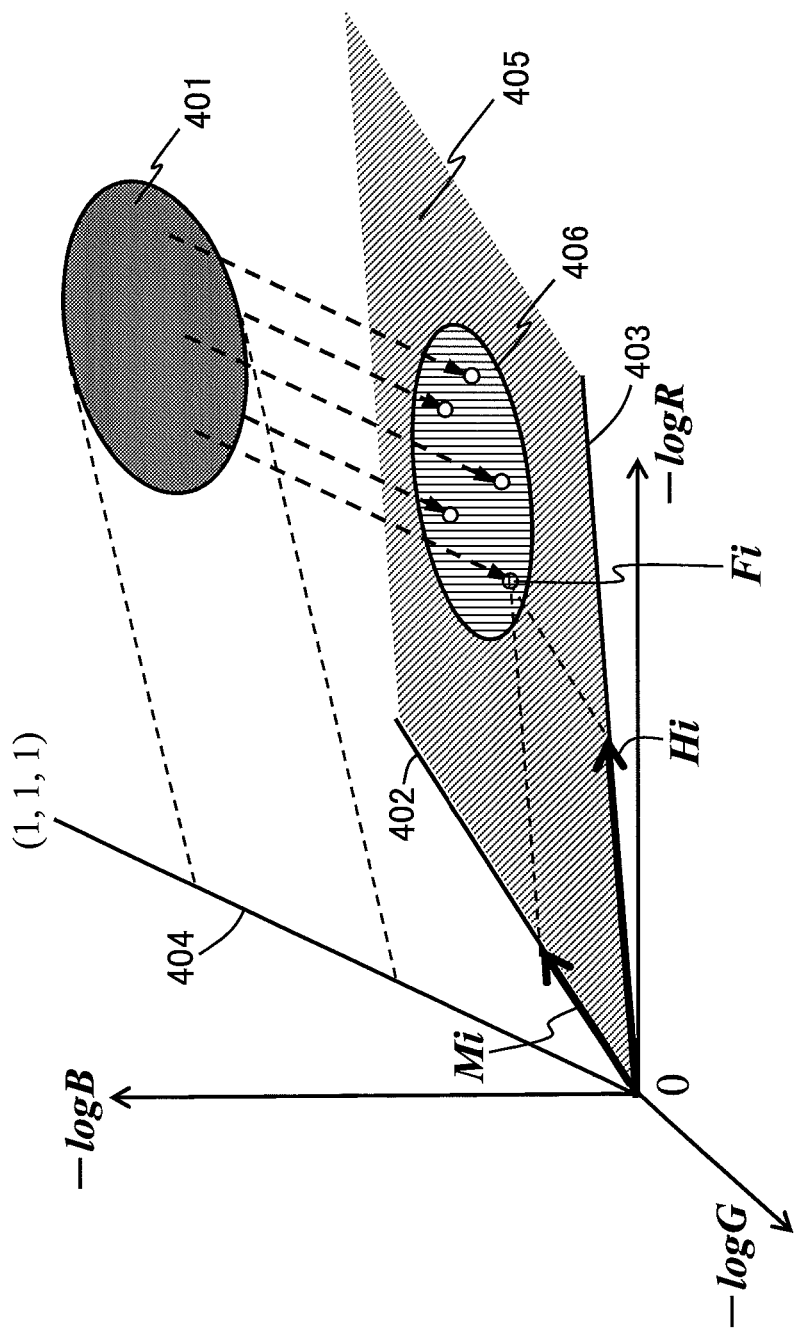
FIG. 4 is a drawing exemplifying distribution of skin information in a logarithmic color space.

FIG. 4 is a drawing exemplifying distribution of skin information 401 extracted by the skin information obtaining unit 201 and plotted in a logarithmic space. FIG. 4 illustrates a melanin pigment component axis 402, a hemoglobin pigment component axis 403, and a shading component axis 404 indicating directions of independent components extracted by the independent component extracting unit 202, and a pigment plane 405 formed by the melanin pigment component axis 402 and the hemoglobin pigment component axis 403.

Because shading components become zero on the pigment plane 405, it is possible to remove the shading components from the skin information 401 plotted in the logarithmic space and obtain projective skin information 406 constituted only by the two pigment components by translating the skin information 401 parallel to the shading component axis 404 and thereby projecting the skin information 401 onto the pigment plane 405. In this case, the distance that each skin information item of the skin information 401 is moved (or translated) to project it onto the pigment plane 405 becomes equal to the density (length) of the shading component of the skin information item.

Also, melanin pigment components and hemoglobin pigment components can be extracted by separating the projective skin information 406 into directional components along the melanin pigment component axis 402 and directional components along the hemoglobin pigment component axis 403. For example, in FIG. 4, Mi indicates a melanin pigment component and Hi indicates a hemoglobin pigment component extracted from a projective skin information item Fi.

Thus, the independent component extracting unit 202 can extract melanin pigment components, hemoglobin pigment components, and shading components of all skin information items constituting the skin area 302/304.

Figure 5:
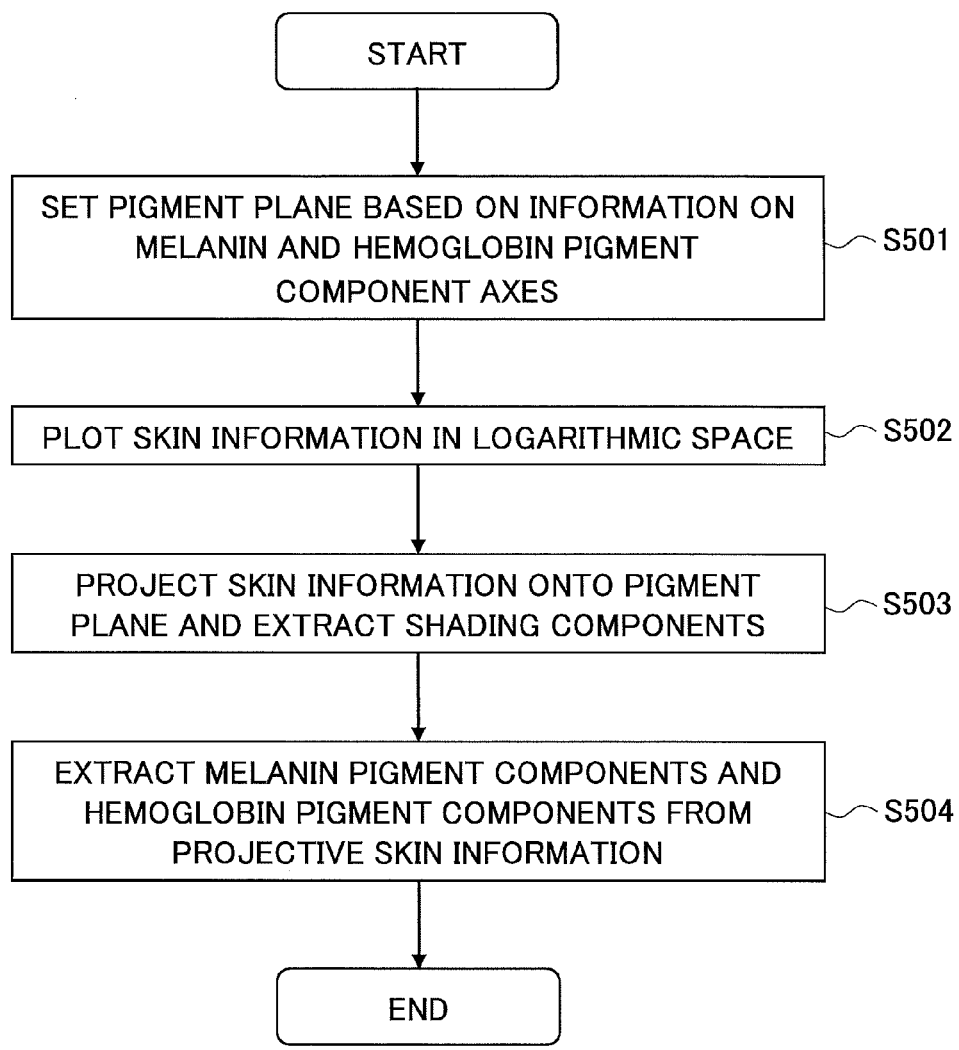
FIG. 5 is a flowchart exemplifying an independent component extracting process.

FIG. 5 is a flowchart exemplifying an independent component extracting process performed by the independent component extracting unit 202.

At step S501, the independent component extracting unit 202 obtains information on the melanin pigment component axis 402 and the hemoglobin pigment component axis 403 from, for example, the main storage 102, and sets the pigment plane 405 formed by the pigment component axes 402 and 403 in a logarithmic space. The information on the melanin pigment component axis 402 and the hemoglobin pigment component axis 403 may be extracted by performing an independent component analysis on a skin reflected light image of a person, and stored beforehand in, for example, the main storage 102.

At step S502, the independent component extracting unit 202 plots the skin information 401 obtained by the skin information obtaining unit 201 in the logarithmic space. At step S503, the independent component extracting unit 202 projects the plotted skin information 401 onto the pigment plane 405, and extracts shading components of respective skin information items of the skin information 401 based on the distances that the skin information items are moved (or translated) for the projection.

At step S504, as described above with reference to FIG. 4, the independent component extracting unit 202 extracts melanin pigment components and hemoglobin pigment components from all projective skin information items of the projective skin information 406 projected onto the pigment plane 405.

<Calculating Bias>

After the independent components (melanin pigment components, hemoglobin pigment components, and shading components) are extracted from the skin information by the independent component extracting unit 203, the bias calculation unit 203 obtains the smallest components from the independent components.

Here, the smallest component of the melanin pigment components is referred to as the "smallest melanin pigment component", the smallest component of the hemoglobin pigment components is referred to as the "smallest hemoglobin pigment component", and the smallest component of the shading components is referred to as the "smallest shading component".

Figure 6:
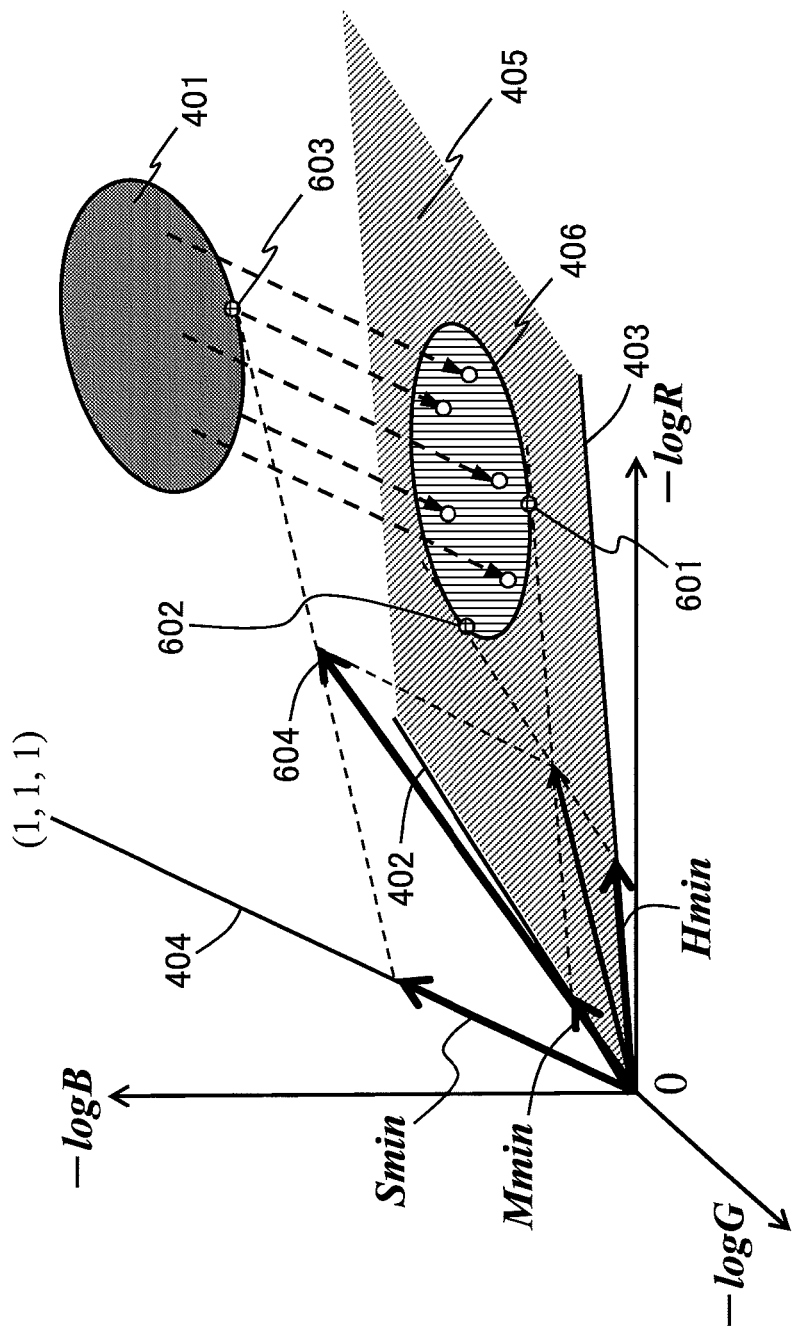
FIG. 6 is a drawing exemplifying smallest independent components and a bias in a logarithmic color space.

FIG. 6 illustrates a smallest melanin pigment component Mmin, a smallest hemoglobin pigment component Hmin, and a smallest shading component Smin. The smallest melanin pigment component Mmin is obtained from a projective skin information item 601 that is closest, among the projective skin information 406 projected onto the pigment plane 405, to the hemoglobin pigment component axis 403. The smallest hemoglobin pigment component Hmin is obtained from a projective skin information item 602 that is closest, among the projective skin information 406 projected onto the pigment plane 405, to the melanin pigment component axis 402.

The smallest shading component Smin is obtained from a skin information item 603 whose movement distance is the shortest when the skin information 401 is projected onto the pigment plane 405.

After obtaining the smallest components of the independent components, the bias calculation unit 203 calculates a bias. Here, a bias is a vector indicating color information of a light source used to illuminate a person when the input image data 301 is captured.

The bias is calculated as a sum (vector sum or composition) of the smallest melanin pigment component Mmin, the smallest hemoglobin pigment component Hmin, and the smallest shading component Smin. In the logarithmic space of FIG. 6, the bias is represented by a vector 604.

When a bias is calculated based only on the smallest components of independent components and one of the smallest components includes erroneous information resulting from, for example, an error in a skin area extracting process, the calculated bias becomes inaccurate. To prevent this problem, each group of independent components (i.e., a group of melanin pigment components, a group of hemoglobin pigment components, and a group of shading components) extracted by the independent component extracting unit 202 may be arranged in ascending order of magnitude, and an average of a predetermined range of independent components from the smallest may be used as the smallest component. The magnitude of a melanin pigment component may be represented by a distance between the melanin pigment component and the hemoglobin pigment component axis 403, the magnitude of a hemoglobin pigment component may be represented by a distance between the hemoglobin pigment component and the melanin pigment component axis 402, and the magnitude of a shading component may be represented by a distance between the shading component and the pigment plane 405. For example, the predetermined range may be N% of the total number of independent components (of each group) extracted by the independent component extracting unit 202. Any appropriate value may be set for "N" depending on the purpose of image processing.

Figure 7A:
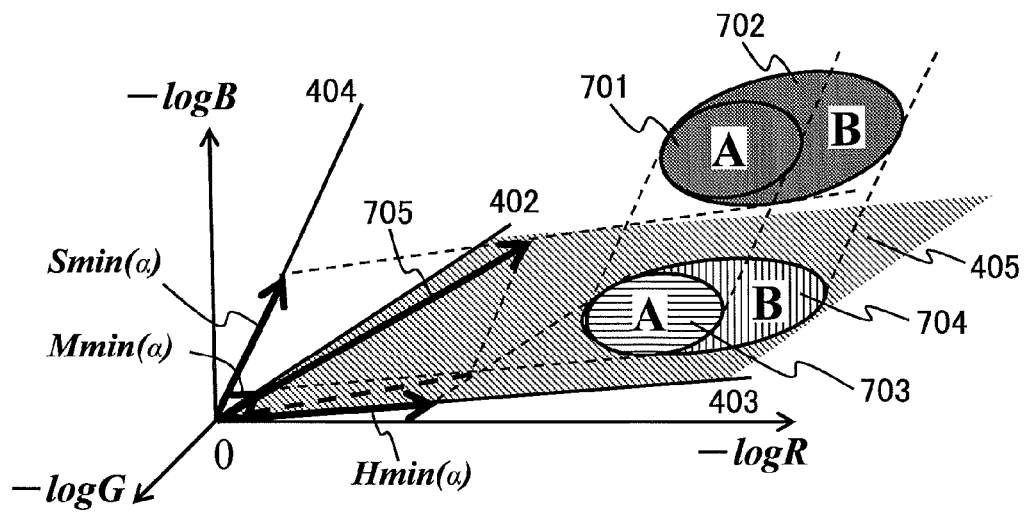
FIGS. 7A and 7B are drawings exemplifying biases calculated by a bias calculation unit.
Figure 7B:
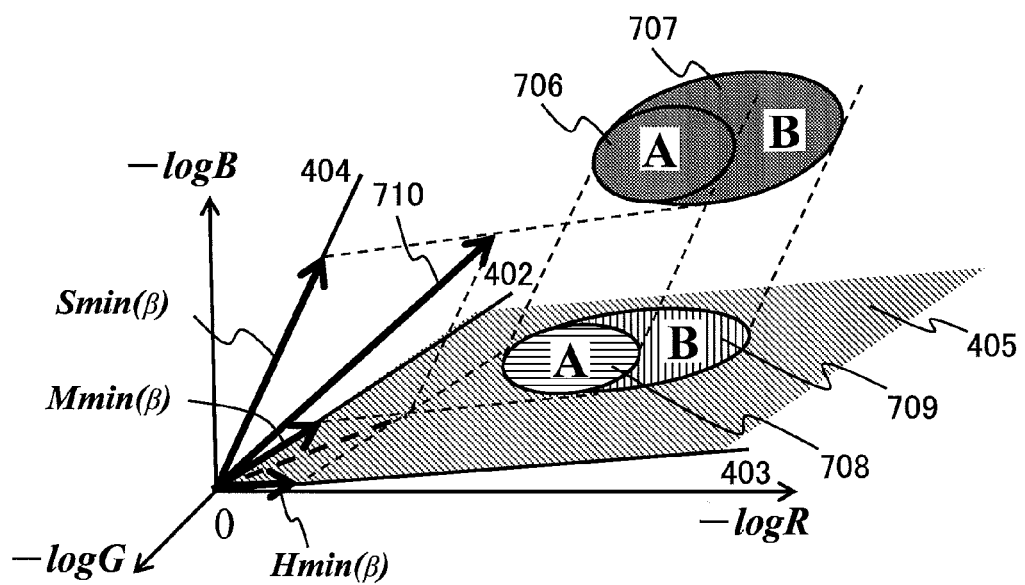

FIGS. 7A and 7B are drawings exemplifying biases 705 and 710 calculated by the bias calculation unit 203 based on a person image captured under light sources with different color characteristics. Here, a light source in the case of FIG. 7A is referred to as a "light source α" and a light source in the case of FIG. 7B is referred to as a "light source β".

FIG. 7A illustrates skin information obtained from image data, which is captured under the light source α, of a person A and a person B having different skin colors. Specifically, FIG. 7A illustrates skin information 701 of the person A, skin information 702 of the person B, projective skin information 703 of the person A obtained by projecting the skin information 701 onto the pigment plane 405, and projective skin information 704 of the person B obtained by projecting the skin information 702 onto the pigment plane 405. FIG. 7B illustrates skin information obtained from image data, which is captured under the light source β, of the person A and the person B having different skin colors. Specifically, FIG. 7B illustrates skin information 706 of the person A, skin information 707 of the person B, projective skin information 708 of the person A obtained by projecting the skin information 706 onto the pigment plane 405, and projective skin information 709 of the person B obtained by projecting the skin information 707 onto the pigment plane 405.

As illustrated by FIGS. 7A and 7B, the distributions of projective skin information (703 and 704, 708 and 709) of persons with different skin colors are different from each other even under the same light source. This is due to, for example, the individual difference in the pigment concentration of melanin caused by suntan of skin or the individual difference in the state of hemoglobin in blood.

However, the applicants have found out, through research, that biases calculated based on skin information of persons with different skin colors become substantially the same when the light source is the same. In FIG. 7A, the same bias 705 is calculated from skin information of the persons A and B obtained under the same light source α. Also in FIG. 7B, the same bias 710 is calculated from skin information of the persons A and B obtained under the same light source β.

Our research has also found out that a bias (705, 710) becomes substantially the same as color information of a light source used to illuminate a target person.

Thus, it is possible to obtain color information of a light source without being influenced by individual differences by calculating a bias that is a sum of the smallest melanin pigment component, the smallest hemoglobin pigment component, and the smallest shading component. As illustrated by FIGS. 7A and 7B, a bias (705, 710) used as light source color information varies depending on the characteristics of a light source (the light source α, the light source β) used when capturing image data. This indicates that proper color correction can be performed on captured image data based on light source color information obtained as a bias.

<Image Correction>

After the bias 604 is calculated by the bias calculation unit 203, the image correction unit 204 performs a color correction process on the input image data 301.

The color correction process is performed to reduce, for example, color casting in captured image data caused by the influence of a light source, and thereby make the color reproduction of the captured image data match the color reproduction of image data captured under a standard light source (e.g., a light source with a color temperature of 5000 K).

In the color correction process of the present embodiment, a bias calculated by the bias calculation unit 203 is replaced with a reference bias representing color information of a standard light source (e.g., color information indicating a color near an achromatic color).

FIG. 8 illustrates an exemplary process where a bias 801 calculated by the bias calculation unit 203 based on skin information 803 of the skin area 302 extracted from the input image data 301 is replaced with a reference bias 802. As a result of replacing the bias 801 with the reference bias 802, the skin information 803 obtained by the skin information obtaining unit 201 is converted into processed skin information 804, and a skin color is thereby corrected.

Figure 9A:
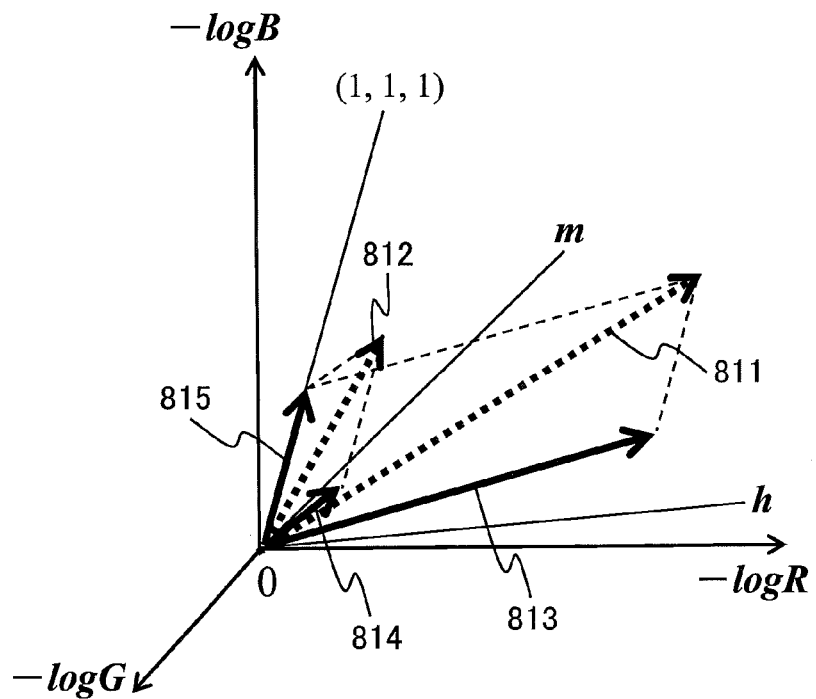
FIGS. 9A and 9B are drawings exemplifying a bias, and pigment components and shading components separated from reference biases.
Figure 9B:
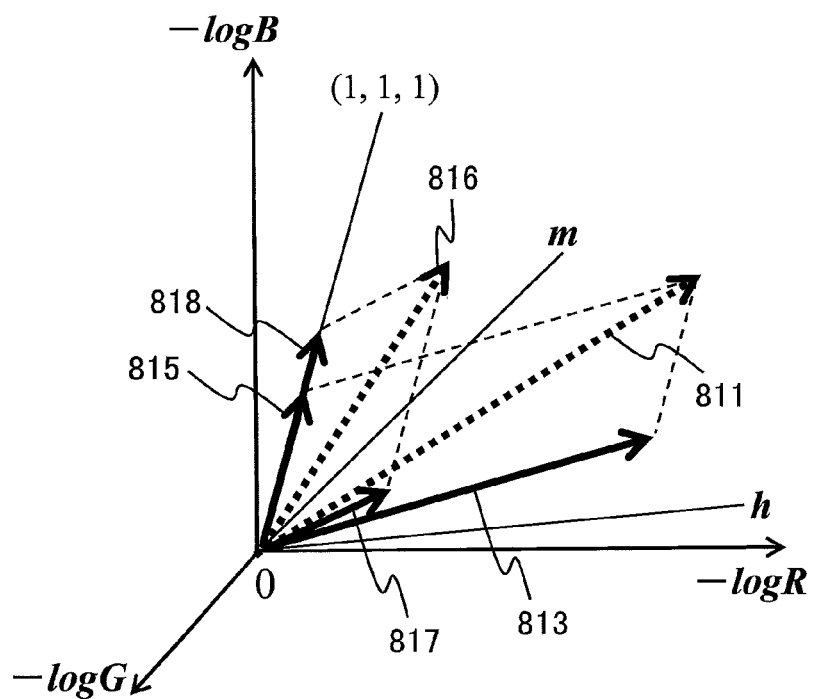

FIGS. 9A and 9B are drawings exemplifying a bias 811 calculated by the bias calculation unit 203, and pigment components and shading components separated from reference biases 812 and 816. Here, a pigment component indicates a composite component of a melanin pigment component and a hemoglobin pigment component. In FIGS. 9A and 9B, a line m indicates a melanin pigment component axis, a line h indicates a hemoglobin pigment component axis, and a (1, 1, 1) direction indicates a shading component axis.

FIGS. 9A and 9B illustrate different types of reference biases.

FIG. 9A illustrates a case where the same shading component 815 is separated from the bias 811 and the reference bias 812. When the same shading component 815 is separated from the bias 811 and the reference bias 812, replacing the bias 811 with the reference bias 812 indicates performing a correction process to change only the color (hue) of the skin area 302 of the input image data 301 without changing its lightness. This method makes it possible to correct only the color (hue) of an input image while maintaining its lightness.

FIG. 9B illustrates a case where the shading component 815 separated from the bias 811 does not match a shading component 818 separated from the reference bias 816. When the shading component 815 does not match the shading component 818, replacing the bias 811 with the reference bias 816 indicates performing a correction process to change both the color (hue) and the lightness of the skin area 302 of the input image data 301. This method is preferable, for example, to correct the exposure (lightness) of a darkened image of a backlit face or an overexposed image of a face.

Below, color correction processes performed in the cases of FIGS. 9A and 9B are described in more detail.

<Case where Shading Components of Bias and Reference Bias are Same: FIG. 9A>

In the color correction process described above, a bias calculated by the bias calculation unit 203 is replaced with a reference bias representing color information of a standard light source. When shading components of a bias and a reference bias are the same as illustrated by FIG. 9A, replacing the bias with the reference bias indicates replacing a pigment component of the bias with a pigment component of the reference bias.

Figure 10A:
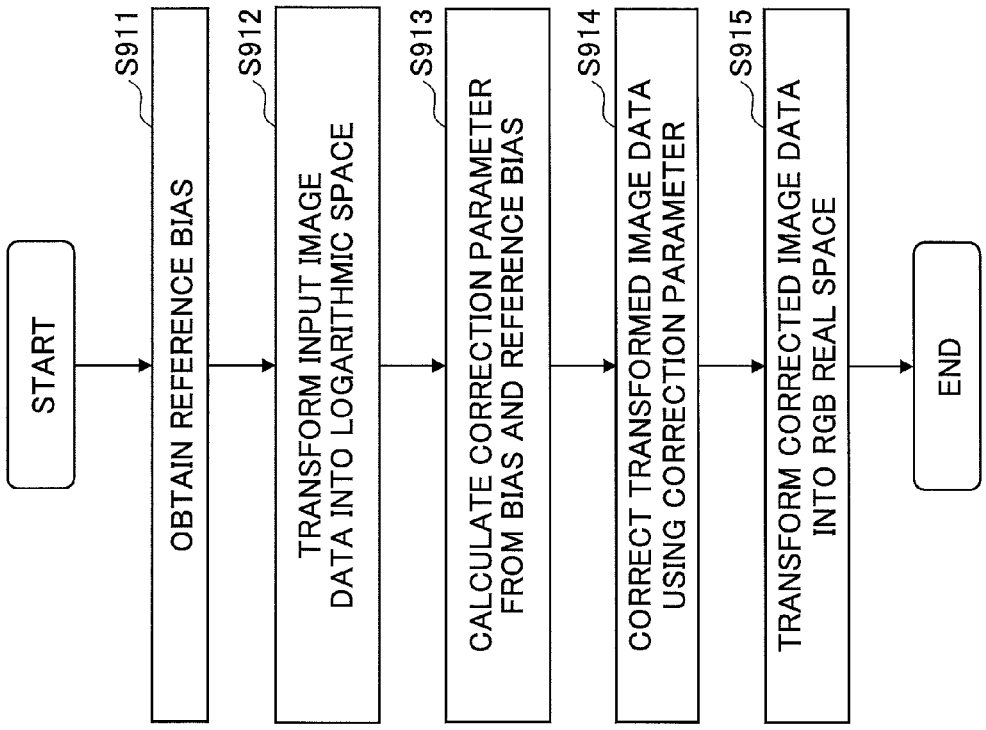
FIGS. 10A and 10B are flowcharts exemplifying image correction processes performed by an image correction unit.
Figure 10B:
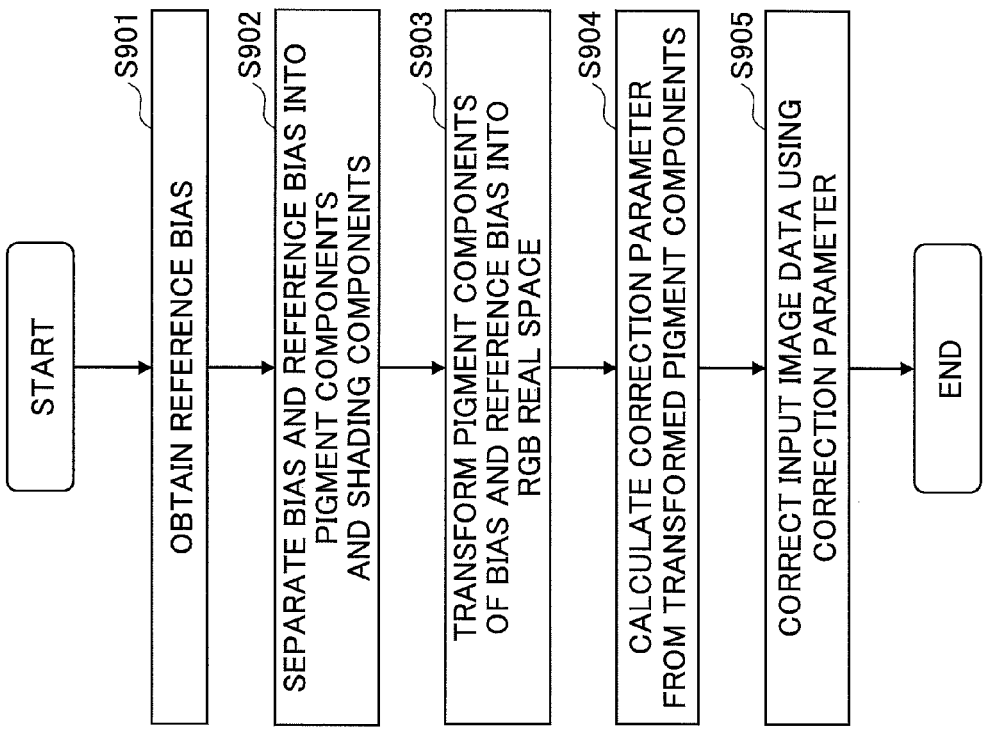

FIGS. 10A and 10B are flowcharts exemplifying image correction processes performed by the image correction unit 204.

FIG. 10A is a flowchart illustrating an exemplary image correction process performed when shading components of a bias and a reference bias are the same. In the descriptions below, B indicates a bias calculated by the bias calculation unit 203, Bt indicates a reference bias, L indicates a pigment component separated from the bias B, and Lt indicates a reference pigment component separated from the reference bias Bt.

At step S901 of FIG. 10A, the image correction unit 204 obtains the reference bias Bt from, for example, the main storage 102. The reference bias Bt is bias information (vector information from the origin of a logarithmic space) of a standard light source and is used as a target in the image correction process. The reference bias Bt is stored, for example, in the main storage 102 beforehand.

The reference bias Bt may be specified by a user by selecting, with the operations unit 106, a target light source used for image correction from a list of target light sources displayed on the display unit 107. In this case, multiple sets of light source color information (vector information in a logarithmic space) are stored in the main storage 102, and one of the sets of light source color information is obtained as the reference bias Bt based on the target light source selected by the user.

At step S902, the image correction unit 204 separates each of the bias B calculated by the bias calculation unit 203 and the reference bias Bt obtained at step S901 into a pigment component and a shading component. Here, L indicates a pigment component separated from the bias B, and Lt indicates a reference pigment component separated from the reference bias Bt.

At step S903, the image correction unit 204 transforms the pigment component L and the reference pigment component Lt into an RGB real space. An RGB pigment component l is obtained by transforming the pigment component L into the RGB real space with a formula l=exp(−L), and an RGB reference pigment component lt is obtained by transforming the reference pigment component Lt into the RGB real space with a formula lt=exp(−Lt).

At step S904, the image correction unit 204 calculates a correction parameter C1 based on the RGB pigment component l and the RGB reference pigment component lt.

The correction parameter C1 is vector information calculated by dividing the RGB pigment component l by the RGB reference pigment component lt (C1=l/lt).

After the correction parameter C1 is calculated at step S904, the image correction unit 204, at step S905, performs a correction process on input image data using the correction parameter C1.

The correction process is performed by multiplying pixel information of all pixels constituting the input image data by the inverse number of the correction parameter C1. When an RGB vector pi indicates a pixel of the input image data and an RGB vector pi' indicates the pixel corrected by the correction process, the RGB vector pi' is obtained by a formula pi'=C1$^{-1}$×pi.

Instead of performing the correction process on the entire input image data, an object area including a person may be identified by detecting objects in the input image data, and the correction process may be performed only on the object area. Also, the degree of the correction process may be gradually changed in an area near the boundary between the object area and other areas.

<Case where Shading Components of Bias and Reference Bias are not Same: FIG. 9B>

When shading components of a bias and a reference bias are not the same as illustrated by FIG. 9B, a correction process is performed by replacing the bias with the reference bias.

FIG. 10B is a flowchart illustrating an exemplary image correction process performed when shading components of a bias and a reference bias are not the same. Here, B indicates a bias calculated by the bias calculation unit 203, and Bt indicates a reference bias.

At step S911 of FIG. 10B, the image correction unit 204 obtains the reference bias Bt from, for example, the main storage 102. The reference bias Bt is bias information (vector information from the origin of a logarithmic space) of a standard light source and is used as a target in the image correction process. The reference bias Bt is stored, for example, in the main storage 102 beforehand.

The reference bias Bt may be specified by a user by selecting, with the operations unit 106, a target light source used for image correction from a list of target light sources displayed on the display unit 107. In this case, multiple sets of light source color information (vector information in a logarithmic space) are stored in the main storage 102, and one of the sets of light source color information is obtained as the reference bias Bt based on the target light source selected by the user.

The user may be allowed to also specify lightness information indicating the lightness of a skin image after correction, and the reference bias Bt may be obtained taking into account the lightness information.

At step S912, the image correction unit 204 transforms pixel components constituting input image data into a logarithmic space. When an RGB vector pi indicates a pixel of the input image data and a log vector Pi indicates the pixel transformed into the logarithmic space, the log vector Pi is obtained by a formula Pi=−log(pi).

At step S913, a correction parameter C2 is calculated based on the bias B and the reference bias Bt.

The correction parameter C2 is vector information calculated by subtracting the reference bias Bt from the bias B (C2=B−Bt).

After the correction parameter C2 is calculated at step S913, the image correction unit 204, at step S914, performs a correction process on the input image data transformed into the logarithmic space using the correction parameter C2.

The correction process is performed by subtracting the correction parameter C2 from pixel information of all pixels constituting the input image data transformed into the logarithmic space. When a log vector Pi indicates a pixel of the input image data transformed into the logarithmic space and a log vector Pi' indicates the pixel corrected by the correction process, the log vector Pi' is obtained by a formula Pi'=Pi−C2.

Instead of performing the correction process on the entire input image data, an object area including a person may be identified by detecting objects in the input image data, and the correction process may be performed only on the object area. Also, the degree of the correction process may be gradually changed in an area near the boundary between the object area and other areas.

At step S915, the image correction unit 204 transforms the input image data corrected by the correction process into an RGB real space.

As described above, the image correction unit 204 can perform a color correction process on input image data where a problem such as color casting has occurred due to the influence of a light source used when capturing the input image data, and can thereby correct the input image data to have a natural and proper color tone (or a color tone desired by the user).

The image data on which the color correction process has been performed by the image correction unit 204 is displayed, for example, on the display unit 107 to allow the user to confirm the result of the color correction process.

<Image Processing>

Figure 11:
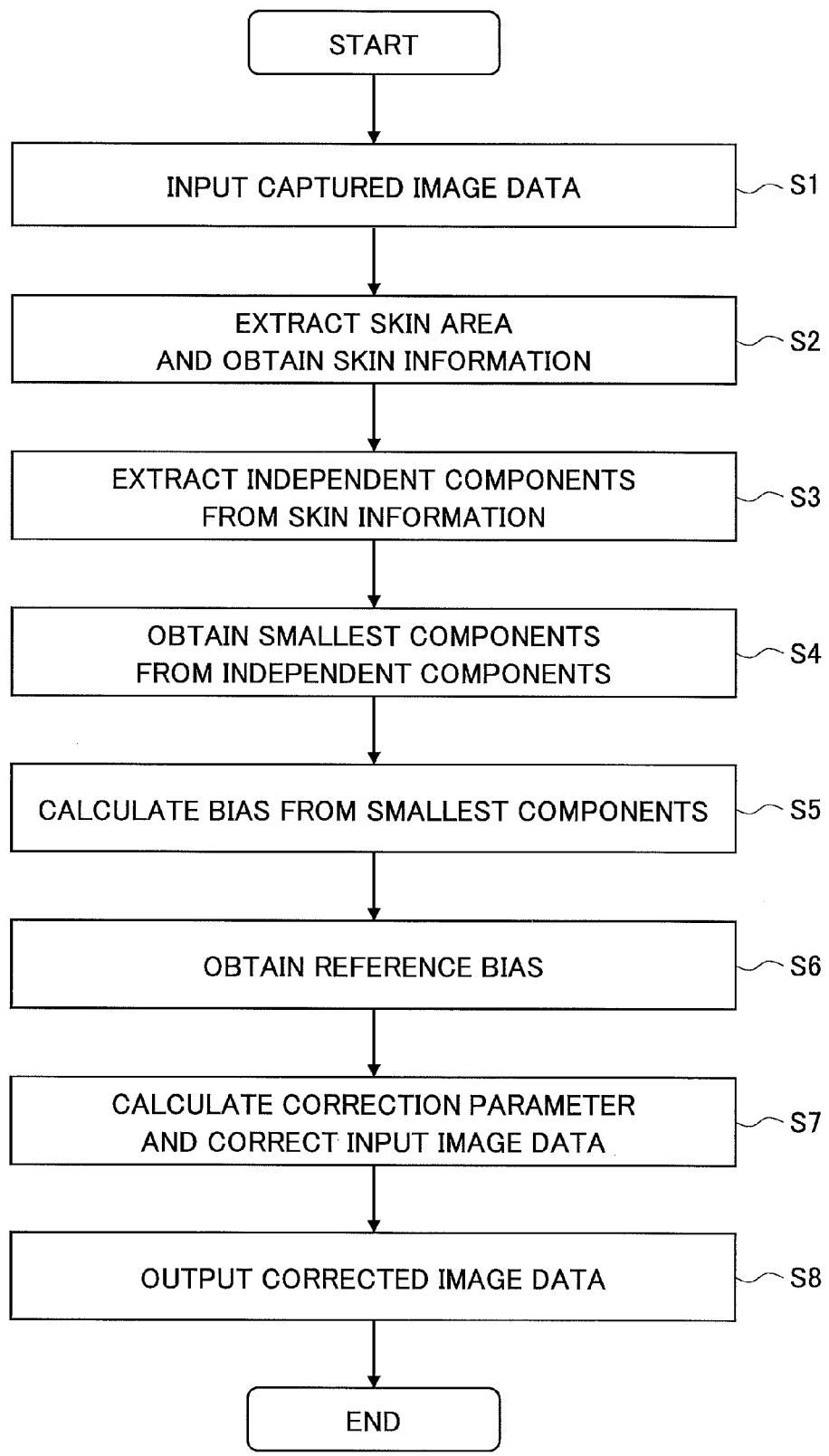
FIG. 11 is a flowchart exemplifying image processing according to the first embodiment.

FIG. 11 is a flowchart exemplifying a process performed by the image processing apparatus 100 according to the first embodiment.

When captured image data (which is hereafter referred to as "input image data") including an image of a person (which is hereafter referred to as a "person image") is input to the image processing apparatus 100 at step S1, the skin information obtaining unit 201, at step S2, extracts a skin area from the input image data and obtains skin information of the person image.

At step S3, the independent component extracting unit 202 extracts, from the skin information, independent components including melanin pigment components, hemoglobin pigment components, and shading components that form a skin color. At step S4, the bias calculation unit 203 obtains the smallest melanin pigment component, the smallest hemoglobin pigment component, and the smallest shading component, respectively, from the melanin pigment components, the hemoglobin pigment components, and the shading components that are extracted at step S3.

At step S5, the bias calculation unit 203 calculates a bias from a sum (vector sum or composition) of the smallest melanin pigment component, the smallest hemoglobin pigment component, and the smallest shading component. The bias represents color information of a light source used to illuminate the person when the input image data is captured.

At step S6, the image correction unit 204 obtains a reference bias indicating a target color to be achieved by a color correction process. At step S7, the image correction unit 204 calculates a correction parameter from the bias calculated at step S5 and the reference bias obtained at step S6, and performs the color correction process on the input image data based on the correction parameter.

After the input image data is corrected by the color correction process at step S7, the image correction unit 204 outputs the corrected image data, and the process is terminated.

As described above, the image processing apparatus 100 of the first embodiment extracts a skin area from input image data, extracts independent components from skin information of the skin area, calculates light source color information (bias) of a light source used when capturing the input image data based on the independent components, and performs a correction process on the input image data based on the bias. Thus, the image processing apparatus 100 makes it possible to easily correct a problem such as color casting in image data.

The image processing apparatus 100 of the first embodiment may be implemented as various types of apparatuses for processing image data such as a multifunction peripheral (MFP), a copier, a printer, a facsimile machine, a scanner, a digital camera, and a personal computer (PC) by adding necessary functions.

Also, the functions of the image processing apparatus 100 of the first embodiment may be implemented, for example, by executing a program(s), which is written in a programming language supported by the image processing apparatus 100, using a processor (e.g., the controller 101) of the image processing apparatus 100. The program(s) for implementing the functions of the image processing apparatus 100 may be stored in a non-transitory computer-readable storage medium such as the storage medium 108 (e.g., a flexible disk (FD), a compact disk (CD), or a digital versatile disk (DVD)), and installed from the storage medium into the image processing apparatus 100.

Alternatively, the program(s) may be downloaded and installed via a telecommunication line such as the Internet and the network I/F 105 into the image processing apparatus 100.

<<Second Embodiment>>

Next, a second embodiment is described with reference to the accompanying drawings. In the second embodiment, descriptions of components and processes similar to those of the image processing apparatus 100 of the first embodiment may be omitted.

In the second embodiment, a multifunction peripheral (MFP) including a print function, a scan function, a copy function, and a facsimile function in one housing is used as an example of an image input apparatus for inputting image data. However, any other apparatus such as a scanner, a facsimile machine, or a copier that can input image data may also be used as an image input apparatus.

<Configuration of Image Processing System>

Figure 12:
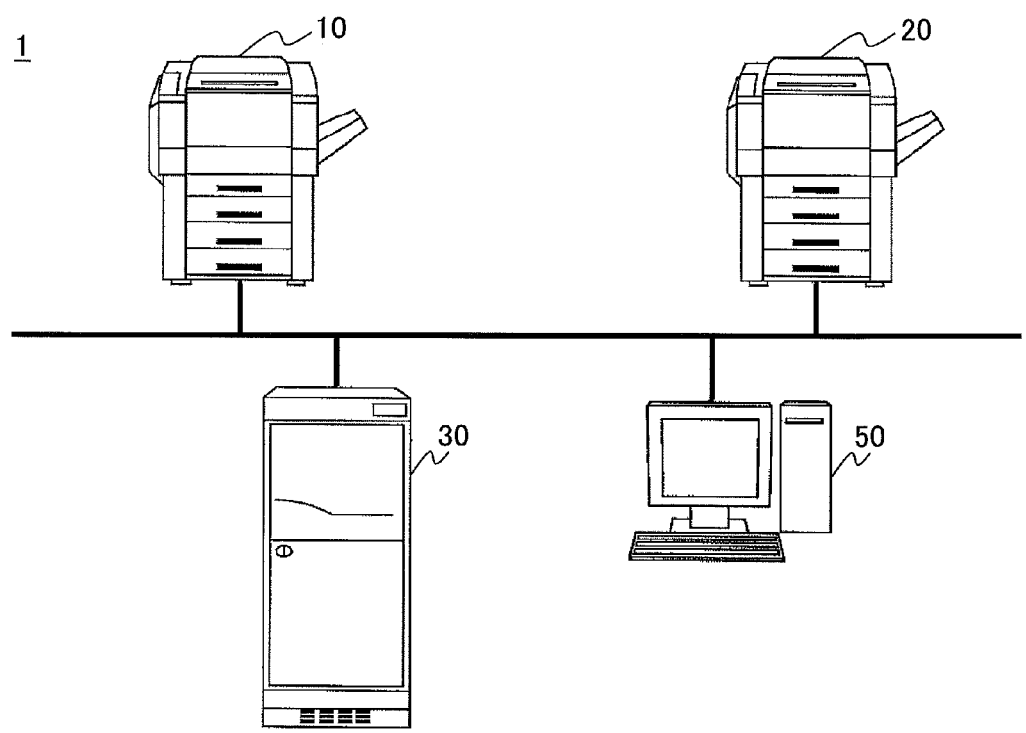
FIG. 12 is a drawing exemplifying a configuration of an image processing system according to a second embodiment.

FIG. 12 is a drawing exemplifying a configuration of an image processing system 1 according to the second embodiment. As illustrated by FIG. 12, the image processing system 1 may include multifunction peripherals (MFP) 10 and 20, an image processing server 30, and an information processing terminal 50 (e.g., a personal computer (PC)).

The MFP 10/20 includes a scan function for scanning an image, a copy function, a printer function, and a facsimile function in one housing. The MFP 10/20 scans, for example, a paper document with the scan function to obtain image data, and sends the obtained image data to the image processing server 30. Details of the MFP 10/20 are described later.

The image processing server 30 may be implemented by a computer such as a workstation that receives image data from the MFP 10/20 or another apparatus via a network and processes the received image data. The image processing server 30 is an example of an image processing apparatus that can perform image processing on image data. The image processing server 30 may be incorporated in the MFP 10/20. Also, functions of the image processing server 30 as an image processing apparatus may be included in the information processing terminal 50.

The image processing system 1 may include any number of MFPs, image processing servers, and information processing terminals connected via a network to each other.

Figure 13:
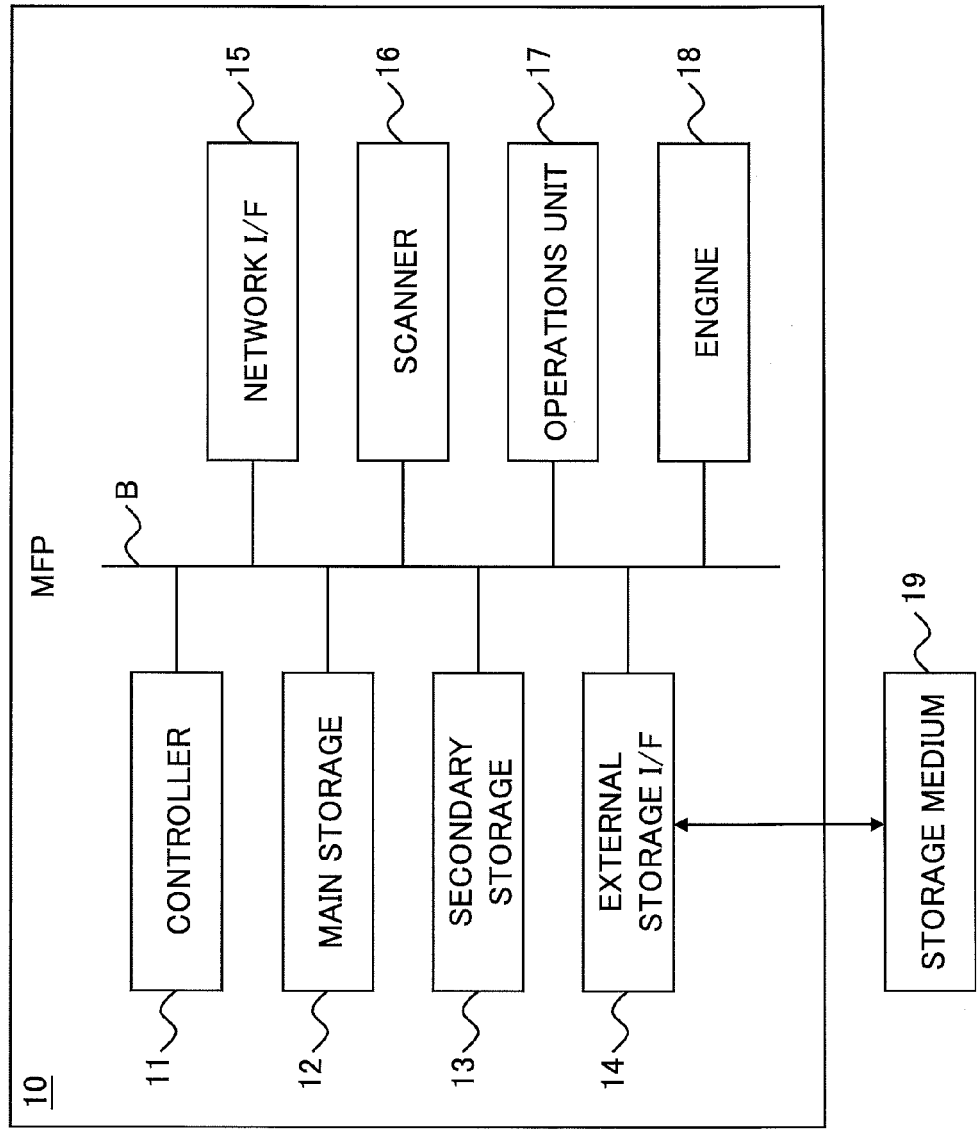
FIG. 13 is a block diagram exemplifying a hardware configuration of an MFP according to the second embodiment.

FIG. 13 is a block diagram exemplifying a hardware configuration of the MFP 10. Although only the MFP 10 is mentioned in the descriptions below, descriptions regarding the MFP 10 may also be applied to the MFP 20.

As illustrated by FIG. 13, the MFP 10 may include a controller (processor) 11, a main storage 12, a secondary storage 13, an external storage I/F 14, a network I/F 15, a scanner 16, an operations unit 17, and an engine 18 that are connected to each other via a bus B.

The controller 11 is a central processing unit (CPU) that controls other components of the MFP 10 and performs calculations and data processing. More specifically, the controller 11 is a processor that executes programs stored in the main storage 12 to receive data from an input unit or a storage unit, process the received data, and output the processed data to an output unit or a storage unit.

The main storage 12 is implemented, for example, by a read-only memory (ROM) or a random access memory (RAM), and (temporarily) stores data and programs such as basic software (operating system (OS)) and application programs to be executed by the controller 11.

The secondary storage 13 is implemented by, for example, a hard disk drive (HDD) and stores data related to, for example, application programs.

The external storage I/F 14 is an interface between the MFP 10 and a storage medium 19 (e.g., a flash memory) connected via a data transmission line such as the universal serial bus (USB).

The storage medium 19 stores, for example, programs. The stored programs are installed via the external storage I/F 14 into the MFP 10 and become executable by the MFP 10.

The network I/F 15 is an interface between the MFP 10 and other devices that include communication units and are connected to the MFP 10 via a network, such as a local area network (LAN) or a wide area network (WAN), implemented by wired and/or wireless data transmission channels.

The scanner 16 scans, for example, a paper document to obtain image data.

The operations unit 17 includes, for example, key switches (or hardware keys) and a liquid crystal display (LCD) including a touch panel (software keys implemented by a graphical user interface (GUI)). That is, the operations unit 17 functions as a display unit and/or an input unit used as a user interface (UI) to enable a user to use functions of the MFP 10.

The engine 18 is a device such as a plotter for forming an image.

Figure 14:
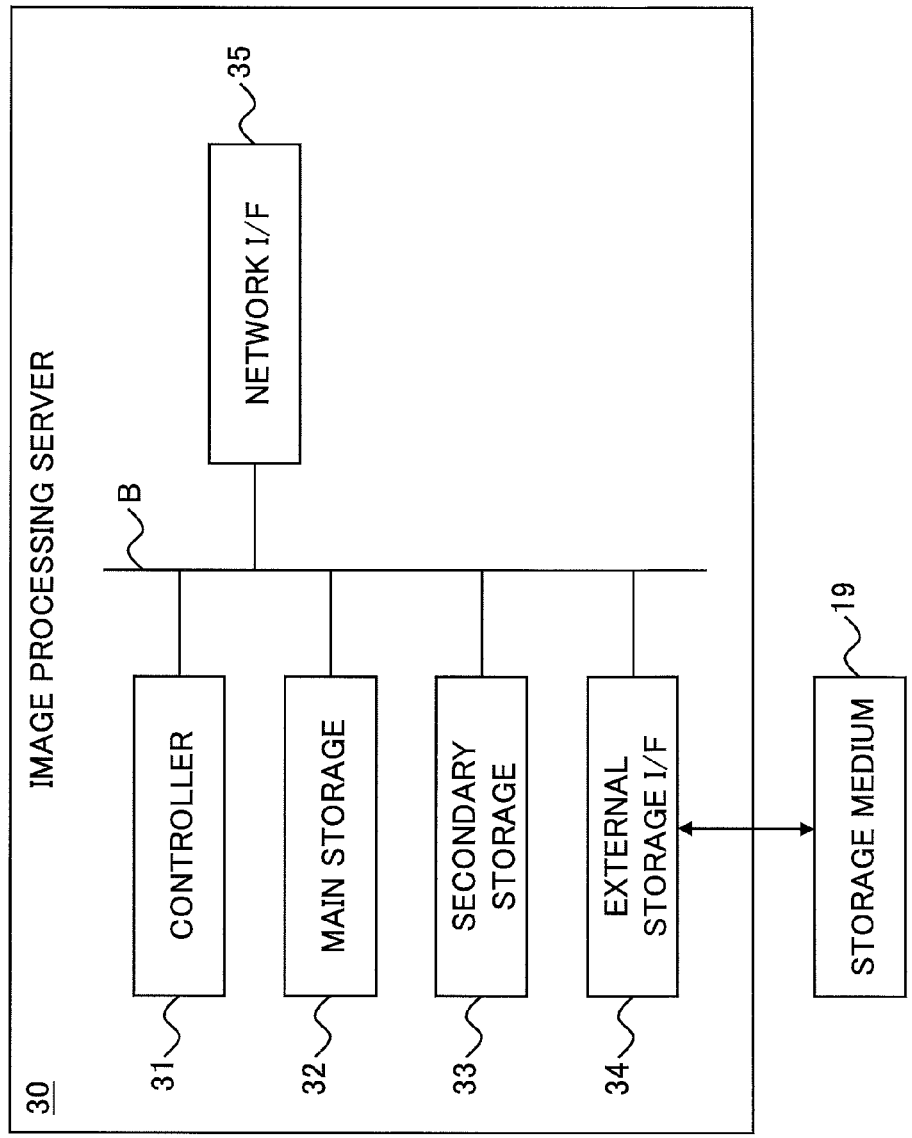
FIG. 14 is a block diagram exemplifying a hardware configuration of an image processing server according to the second embodiment.

FIG. 14 is a block diagram exemplifying a hardware configuration of the image processing server 30.

As illustrated by FIG. 14, the image processing server 30 may include a controller (processor) 31, a main storage 32, a secondary storage 33, an external storage I/F 34, and a network I/F 35 that are connected to each other via a bus B.

The CPU 31 is a central processing unit (CPU) that controls other components of the image processing server 30 and performs calculations and data processing. More specifically, the controller 31 is a processor that executes programs stored in the main storage 32 to receive data from an input unit or a storage unit, process the received data, and output the processed data to an output unit or a storage unit.

The main storage 32 is implemented, for example, by a read-only memory (ROM) or a random access memory (RAM), and (temporarily) stores data and programs such as basic software (operating system (OS)) and application programs to be executed by the controller 31.

The secondary storage 33 is implemented by, for example, a hard disk drive (HDD) and stores data related to, for example, application programs.

The external storage I/F 34 is an interface between the image processing server 30 and a storage medium 19 (e.g., a flash memory) connected via a data transmission line such as the universal serial bus (USB).

The storage medium 19 stores, for example, programs. The stored programs are installed via the external storage I/F 34 into the image processing server 30 and become executable by the image processing server 30.

The network I/F 35 is an interface between the image processing server 30 and other devices that include communication units and are connected to the image processing server 30 via a network, such as a local area network (LAN) or a wide area network (WAN), implemented by wired and/or wireless data transmission channels. Although the image processing server 30 of FIG. 14 includes no operations unit and no display unit, the image processing server 30 may be configured to include an operations unit such as a keyboard and a display unit such as an LCD.

The hardware configuration of the information processing terminal 50 is substantially the same as the hardware configuration of the image processing apparatus 100 of the first embodiment illustrated by FIG. 1.

<Functional Configuration of Image Processing System>

Figure 15:
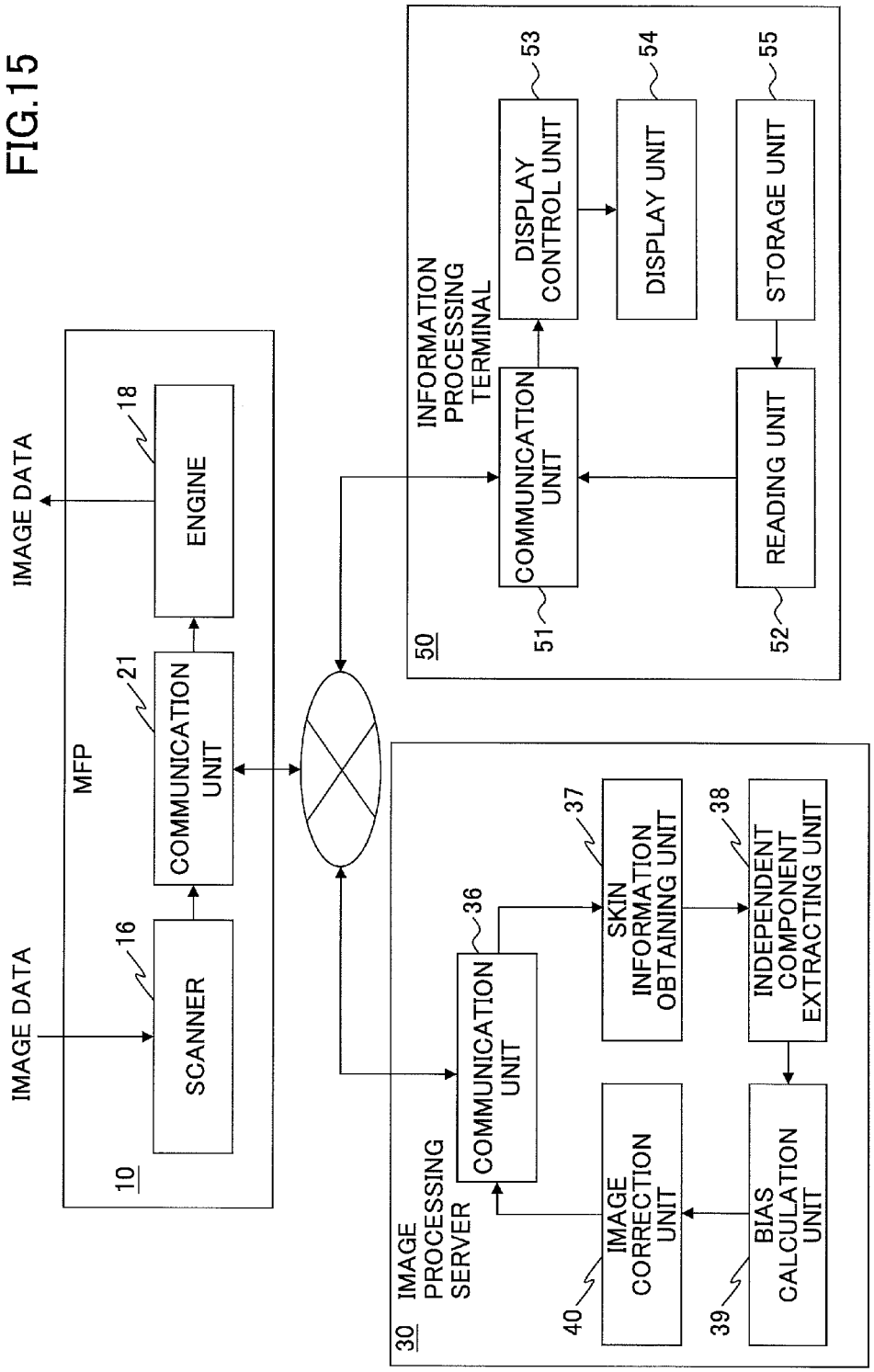
FIG. 15 is a block diagram exemplifying a functional configuration of an image processing system according to the second embodiment.

FIG. 15 is a block diagram exemplifying a functional configuration of the image processing system 1 according to the second embodiment.

The MFP 10 may include the scanner 16, a communication unit 21, and the engine 18.

The scanner 16 scans, for example, a paper document to obtain image data on which image processing is to be performed.

The communication unit 21 receives image data stored in a storage unit 55 of the information processing terminal 50. The communication unit 21 also sends image data obtained by the scanner 16 to the image processing server 30 that is an example of an image processing apparatus, and receives the image data on which image processing has been performed by the image processing server 30.

The engine 18 prints image data, on which image processing has been performed by the image processing server 30, on a recording medium such as recording paper. Also, the engine 18 prints image data converted by the image processing server 30, on a recording medium.

The image processing terminal 50 may include a communication unit 51, a reading unit 52, a display control unit 53, a display unit 54, and the storage unit 55.

The storage unit 55 stores, for example, image data, pigment component axis information, and a reference bias(es).

The reading unit 52 reads image data and a reference bias from the storage unit 55.

The communication unit 51 sends, for example, image data read by the reading unit 52 to the MFP 10 or the image processing server 30. Also, the communication unit 51 receives, for example, image data sent from the MFP 10 or the image processing server 30.

The display control unit 53 displays image data received by the communication unit 51 on the display unit 54. Also, the display control unit 53 displays image data stored in the information processing terminal 50 on the display unit 54.

The display unit 54 may be implemented by, for example, a liquid-crystal display or an organic electroluminescence (EL) display, and displays image data and operation icons.

The image processing server 30 may include a communication unit (module) 36, a skin information obtaining unit (module) 37, an independent component extracting unit (module) 38, a bias calculation unit (module) 39, and an image correction unit (module) 40. The functions of these units are substantially the same as those of the corresponding units of the image processing apparatus 100 of the first embodiment.

With the image processing system 1 configured as described above, a user, for example, obtains image data (or a target image to be processed) by using the scanner 16 of the MFP 10, and requests the image processing server 30 to perform image processing on the image data. As another example, a user reads image data to be processed from the information processing terminal 50, and requests the image processing server 30 to perform image processing on the image data.

At the image processing server 30, the skin information obtaining unit 37 obtains skin information from a skin area extracted from the image data, the independent component extracting unit 38 extracts groups of independent components from the skin information, the bias calculation unit 39 obtains the smallest components from the respective groups of independent components and calculates a bias representing color information of a light source used when capturing the image data based on the smallest components, and the image correction unit 40 corrects the image data based on the calculated bias and a reference bias read from the storage unit 55 of the information processing terminal 50. Then, the corrected image data is printed by the engine 18 of the MFP 10, or is displayed on the display unit 54 by the display control unit 53 of the information processing terminal 50.

The functions of the image processing server 30 may be incorporated in the information processing terminal 50. In this case, the information processing terminal 50 performs image processing on image data.

The user may send the corrected (or processed) image data via a network to the MFP 10, and request the engine 18 of the MFP 10 to print the corrected image data on a recording medium to obtain an output of the corrected image data.

Alternatively, the user may send the corrected (or processed) image data via a network to the information processing terminal 50, and request the display control unit 53 of the information processing terminal 50 to display the corrected image data on the display unit 54 to confirm the corrected image data.

As described above, the image processing system 1 of the second embodiment enables a user to obtain image data to be processed by using, for example, the MFP 10, and perform image processing on the image data using the image processing server 30 or the information processing terminal 50.

<<Summary>>

As described above, according to the embodiments of the present invention, a skin area is extracted from input image data, independent components are extracted from skin information of the skin area, light source color information of a light source used when capturing the input image data is estimated based on the independent components, and a correction process is performed on the input image data based on the estimated light source color information. This configuration or method makes it possible to easily correct a problem such as color casting in image data.

An aspect of this disclosure provides an image processing apparatus, an image processing system, an image processing method, and a storage medium that can accurately estimate characteristics of a light source used when capturing image data based only on information of a skin area in the image data, and can easily correct a problem such as color casting in image data that is caused by the influence of the light source.

An image processing apparatus, an image processing system, an image processing method, and a storage medium according to the embodiments of the present invention are described above. However, the present invention is not limited to the specifically disclosed embodiments, and variations and modifications may be made without departing from the scope of the present invention.

What is claimed is:

1. An image processing apparatus, comprising:
   a memory that stores a program; and
   a processor that executes the program stored in the memory to perform a process, the process including
      extracting a skin area from an image and obtaining skin information from the skin area,
      extracting independent components including melanin pigment components, hemoglobin pigment components, and shading components that constitute the skin area from the skin information,
      obtaining a smallest component of the melanin pigment components, a smallest component of the hemoglobin pigment components, and a smallest component of the shading components, and
      calculating, based on a sum of at least the obtained smallest component of the melanin pigment components and the obtained smallest component of the hemoglobin pigment components, a bias representing color information of a light source used to illuminate the skin area when the image is captured.

2. The image processing apparatus as claimed in claim 1, wherein the processor,
   obtains one of the melanin pigment components that is closest to a line indicating a direction of the hemoglobin pigment components as the smallest component of the melanin pigment components, and
   obtains one of the hemoglobin pigment components that is closest to a line indicating a direction of the melanin pigment components as the smallest component of the hemoglobin pigment components.

3. The image processing apparatus as claimed in claim 1, wherein the processor
   obtains an average of a predetermined range of the melanin pigment components in ascending order of magnitude as the smallest component of the melanin pigment components, the magnitude of the melanin pigment components being represented by distances between the melanin pigment components and a line indicating a direction of the hemoglobin pigment components, and
   obtains an average of a predetermined range of the hemoglobin pigment components in ascending order of magnitude as the smallest component of the hemoglobin pigment components, the magnitude of the hemoglobin pigment components being represented by distances between the hemoglobin pigment components and a line indicating a direction of the melanin pigment components.

4. The image processing apparatus as claimed in claim 1, wherein the processor obtains, as the smallest component of the shading components, one of the shading components that is closest to a plane including a line indicating a direction of the melanin pigment components and a line indicating a direction of the hemoglobin pigment components.

5. The image processing apparatus as claimed in claim 1, wherein the processor obtains, as the smallest component of the shading components, an average of a predetermined range of the shading components in ascending order of magnitude, the magnitude of the shading components being represented by distances between the shading components and a plane including a line indicating a direction of the melanin pigment components and a line indicating a direction of the hemoglobin pigment components.

6. The image processing apparatus as claimed in claim 1, wherein the process further includes
correcting the image based on the bias.

7. The image processing apparatus as claimed in claim 6, wherein the processor obtains a reference bias to be used as a target in correcting the image, and corrects the image based on the bias and the reference bias.

8. The image processing apparatus as claimed in claim 7, wherein the reference bias is information indicating a color near an achromatic color.

9. The image processing apparatus as claimed in claim 7, wherein the reference bias is color information specified by a user.

10. The image processing apparatus as claimed in claim 7, wherein
the process further includes calculating a correction parameter based on the bias and the reference bias, and
the processor corrects the image by performing arithmetic operations on at least a part of the image using the correction parameter.

11. An image processing system, comprising:
an image processing apparatus; and
an information processing terminal connected via a network to the image processing apparatus,
wherein the image processing apparatus includes
a memory that stores a program; and
a processor that executes the program stored in the memory to perform a process, the process including
extracting a skin area from an image and obtaining skin information from the skin area,
extracting independent components including melanin pigment components, hemoglobin pigment components, and shading components that constitute the skin area from the skin information,
obtaining a smallest component of the melanin pigment components, a smallest component of the hemoglobin pigment components, and a smallest component of the shading components, and
calculating, based on a sum of at least the obtained smallest component of the melanin pigment components and the obtained smallest component of the hemoglobin pigment components, a bias representing color information of a light source used to illuminate the skin area when the image is captured.

12. A method performed by an image processing apparatus, the method comprising:
extracting a skin area from an image;
obtaining skin information from the skin area;
extracting independent components including melanin pigment components, hemoglobin pigment components, and shading components that constitute the skin area from the skin information;
obtaining a smallest component of the melanin pigment components, a smallest component of the hemoglobin pigment components, and a smallest component of the shading components; and
calculating, based on a sum of at least the obtained smallest component of the melanin pigment components and the obtained smallest component of the hemoglobin pigment components, a bias representing color information of a light source used to illuminate the skin area when the image is captured.

13. A non-transitory computer-readable storage medium having a program stored therein for causing a computer to perform the method of claim 12.

* * * * *